United States Patent Office 3,409,396
Patented Nov. 5, 1968

3,409,396
PREPARATION OF WHITE FUSED ALUMINA
Harry E. Osment, Robert B. Emerson, and Robert L. Jones, Baton Rouge, La., assignors to Kaiser Aluminum & Chemical Corporation, Oakland, Calif., a corporation of Delaware
No Drawing. Filed Mar. 30, 1966, Ser. No. 538,533
9 Claims. (Cl. 23—142)

This invention relates to fused alumina. More specifically, this invention relates to the production of a fused alumina product substantially free of achromatic and chromatic discoloration.

In the manufacture of electrically fused aluminum oxide or synthetic corundum, commercially pure crystalline alumina, i.e., the calcined hydrate from the Bayer process, is fused at high temperature usually in a carbon electrode electric arc furnace. The fused mass, after cooling, is a block of alumina which can thereafter be crushed and ground to appropriate particle size for industrial use. In the manufacture of electrically fused aluminum oxide or synthetic corundum, it is necessary to employ a calcined alumina of high chemical purity as feed to the furnace in order to obtain a white color-free billet from the solidified melt. Electrically fused alumina finds widespread industrial application as a refractory material, for example, as a lining for glass melting equipment and is also crushed and graded to certain sizes for use as an abrasive grain in manufacture of grinding wheel and cutting tools.

In most applications of fused alumina, the color of the product has considerable influence on its acceptability and a white homogeneous product free of achromatic and chromatic discoloration is required.

Calcined alumina as produced by the conventional Bayer process is ordinarily employed as a source material for manufacture of electrically fused alumina. As discharged from the calcining kiln, this alumina may appear absolutely white and its purity may be high by ordinary standards, yet the discoloration in the subsequent fused product can nevertheless occur. Bauxite from which the calcined alumina is manufactured varies greatly in its chemical purity depending upon the locations from which it is mined. In processing or refining the bauxite by the Bayer process, it is not possible to completely remove certain trace impurities, particularly transition elements such as manganese and chromium which are known to be strong coloring agents in fused alumina. As a consequence of the wide variation in composition of trace elements in bauxite, and the fact that these elements are not completely removed through the refining operation of the Bayer process, a calcined alumina produced from a commercially satisfactory bauxite might be unsuitable for the production of white electrically fused alumina. If the concentration level of certain impurity elements exceeds a threshold value, various chromatic discolorations are produced in the fused alumina; colors ranging from blue to green and pink are particularly objectionable and are frequently encountered. Achromatic discoloration such as gray shadings are also frequently encountered.

Accordingly, the instant invention is concerned with providing a unique process for producing a white fused alumina which is substantially free of chromatic and achromatic discoloration. An important advantage of the process of the instant invention is that regardless of the particular bauxite used as a source of the calcined alumina, these objectionable achromatic and chromatic discolorations can be substantially eliminated.

Other purposes and advantages of the instant invention will become apparent from the ensuing detailed description.

The achromatic discoloration of the fused alumina product usually occurs as a gray discoloration appearing throughout the product. Many theories have been advanced as to the cause of this gray discoloration. The most favored theory at the present time is that the gray-black achromatic discoloration of the fused alumina product results from removal of carbon from the electrodes in the arc furnace operated at high current densities with the attendant contamination of the alumina. This coloration can be controlled to a certain extent by controlling the degree of calcination of the alumina. If the alumina is too highly calcined, it will have a greater tendency to remove carbon from the electrodes at high current densities. On the other hand, standard metallurgical grade calcined alumina is not sufficiently calcined for the production of a satisfactory fused alumina product in that it contains excessive water which will result in excessive gassing during the fusion. Accordingly, the degree of calcination of the alumina must be controlled within certain limits. The alizarin dye test is a well known and simple test for the degree of calcination of the alumina. The test measures both the nature of the surface and quantity of surface available; aluminas calcined to a lesser degree have relatively larger surfaces that are capable of adsorbing the dye, whereas as the calcination approaches the production of essentially pure alpha alumina, the surface is quantitatively and qualitatively less capable of adsorbing the dye. Thus, a sample of the calcined alumina may be impregnated with alizarin dye and the resulting coloration correlated against known standards. It has been found that an alizarin dye number for the calcined alumina product between 7 and 9 which indicates a total water content of 0.5% to 1% is desirable.

However, even when the alumina has been calcined to an alizarin dye number between 7 and 9, the objectionable gray-black achromatic discoloration although greatly reduced has not been completely eliminated. Various techniques have been proposed for the reduction of the objectionable gray-black discoloration. U.S. Patent 2,961,296 to Michael J. Fenerty deals with one such technique. According to this patent, the maintenance of a reducing atmosphere within the kiln during calcination of the alumina hydrate greatly reduces the amount of gray-black discoloration present in the final fused alumina product.

It has now been discovered that the addition of a small but effective quantity of a fluoride salt, such as aluminum fluoride to the calcined alumina before it is melted and fused in the electric furnace is highly effective in eliminating or substantially reducing the amount of gray-black discoloration present in the final fused alumina product. This is believed to be attributed to the increased conductivity of the melt imparted by fluoride addition.

As the achromatic gray-black discoloration throughout the mass of the cast product is reduced, the presence of chromatic discolorations such as blue, green and pink colors becomes increasingly apparent. These discolorations are not present throughout the mass of the fused product but tend to concentrate in the last portion of the mass of alumina to solidify. Exactly why this is so is not completely understood at the present time but it is postulated that the discoloration is due to the presence of certain transition elements, such as manganese and chromium in the alumina, which are known to be strong coloring agents in fused alumina. It is postulated that as the fused alumina solidifies, a zone refining effect occurs and these elements concentrate in the last portion of the alumina to solidify so that the discoloration becomes very pronounced in that portion of the solidified product.

Based on this theory as to the cause of the chromatic discoloration, it was further postulated that if these transition elements were reduced to a lower valence such that their color intensity within the host crystal was not as great and were kept uniformly dispersed throughout the mass of the fused and cast alumina product, the discoloration could be substantially eliminatetd and a satisfactory white fused cast alumina product would result.

Modern solid state physics explains the phenomenon of color center formation in normally transparent crystals as the trapping of electrons or holes at lattice defects; valence differences between impurity ions and the ions of the host crystals have a direct relationship to formation of color centers. Schulman, J. H. and Compton, W. D., International Series of Monographs on Solid State Physics, vol. 2, "Color Centers in Solids," MacMillan Co., New York, 1962, p. 27.

On the basis of this highly theoretical analysis of the problem, various additives were tested to determine their effectiveness in reducing the objectionable discoloration with varying degrees of success. The results of these tests are shown in the table.

TABLE

| Sample No. | Alizarin Dye No. | Billet No. | Additives | Billet Description |
| --- | --- | --- | --- | --- |
| 1 | 8.5 | 179 | None | Med. gray, no pink or green. |
|  |  | 180 | 0.2% AlF$_3$ | White, pink, no green. |
|  |  | 187 | 0.2% Na$_2$CO$_3$ | Very light gray-green. |
|  |  | 189 | 0.2% Li$_2$CO$_3$ | Dark gray-green. |
| 2 | 7.0 | 181 | None | Med. gray, no pink or green. |
|  |  | 186 | 0.2% AlF$_3$ | Very light gray, very slight pink and green. |
|  |  | 190 | 0.2% NaF | Med. gray, no green. |
| 3 | 6.0 | 182 | None | Light gray, very slight localized green crust in area surrounding electrode. |
|  |  | 191 | 0.2% Na$_2$CO$_3$ | Medium gray, slight green and pink. |
|  |  | 192 | 0.2% AlF$_3$ | Light gray, slight pink. |
| 4 | 8.5-9.0 | 183 | None | Light gray, green and blue. |
|  |  | 193 | 0.5% motor oil | Almost white, slight green in crust. |
| 5 | 5.5 | 184 | None | Medium gray, very slight green. |
|  |  | 188 | 0.2% AlF$_3$ | Medium gray, no green. |
| 6 | 6.0 | 185 | None | Medium gray, some pink and green. |
|  |  | 194 | 0.1% Hy Vac Oil | Medium gray, no green or pink. |

Although the additives shown in the table would not result in a satisfactory white fused cast aluminum product, it has been found that certain additives will result in a satisfactory white fused cast alumina product. Specifically, it has been found that if a thermoplastic resin consisting essentially of at least one straight chain hydrocarbon resin in which considerable cyclic but no aromatic structures are present is blended with the calcined alumina prior to the fusing of the alumina, a white fused alumina product substantially free of chromatic discoloration is formed when the calcined alumina is fused and solidified. Examples of satisfactory thermoplastic resins are alicyclic compounds, such as terpenes, pinenes, alpha-pinenes, which are known in the trade as Piccolytet resins; and petroleum alicyclic hydrocarbon resins produced by the catalytic polymerization of dienes and olefins from low-boiling distillates of cracked petroleum stocks. It has been found that petroleum alicyclic hydrocarbon resins produced by the catalytic polymerization of dienes and olefins from low-boiling distillates of cracked petroleum stocks are particularly effective. Examples of these latter resins, known in the trade as Piccopale resins, are described in greater detail in Canadian Patent 531,202 to Alger L. Ward. For convenience, they shall be referred to here as Piccopale resins. In order also to substantially remove achromatic discoloration, a fluoride salt, such as aluminum fluoride, may be blended with the calcined alumina prior to the fusing of the alumina. It has been found that if the alizarin dye number of the calcined alumina is maintained between 7 and 9, less that 1% of the thermoplastic resin and less than 1% of the fluoride salt need be added to give a white fused cast alumina product substantially free of both chromatic and achromatic discoloration. If the thermoplastic resin is hydrogenated alpha-pinene or a Piccopale resin, it has been found that 0.1% resin added to the calcined alumina is sufficient for substantially eliminating the chromatic discoloration.

Twelve samples of calcined alumina, taken at random from several commercial kilns over a period of several weeks, were tested, first by performing a fushion in the "as is" condition and then with 0.1% of a thermoplastic resin consisting essentially of a hydrogenated Piccopale resin being added to the calcined alumina before fusion. In every instance, test fusions from the calcined product in the "as is" condition were discolored. Colors ranging from light blue to intense blue-green and pink were obtained. The same samples, treated with the additive, resulted in essentially complete elimination of the chromatic discoloration. The electric furnace used in these tests was equipped with a water cooled steel receiver to hold 10–15 pounds of alumina and was provided with two 1¼" movable graphite electrodes which extended into the receiver. The electrodes were connected to a 600 amp DC power supply. The test fusions were prepared by striking an arc between the two electrodes submerged in the alumina. As the alumina melted and fused, more alumina was added until a 10–15 pound billet was obtained. This required approximately 20 minutes at a power input of 250–300 amps at 60–70 volts DC. Unmelted alumina acted as a protective envelope or container preventing the fused alumina from contacting the walls of the steel vessel. When the fusion was complete the electrodes were withdrawn and the fused mass was allowed to cool and solidify. It was then separatetd from the unfused alumina, broken in half and inspected.

The exact mechanism by which the invention described above functions has not been definitely established. It is postulated, however, that two mechanisms or a combination of both are possible:

(1) The resin additive volatilizes during the fusion and creates a reducing atmosphere in situ, which reduces the effective valency of the suspected transition element impurities, thus changing the electronic structure of these impurity sites in the host alumina crystal in such a way as to inhibit formation of color centers.

(2) Volatilization of the resin additive during fusion results in greater turbulence of the fused mass from ascending gas bubbles. This effect continues during and following fusion and can result in perturbation of the zone refined layer. Turbulence and perturbation of the zone refined layer would be expected to result in greater dispersion of impurities throughout the solidified billet, thus minimizing the concentration of impurity atoms, hence color centers, in any particular zone.

Thus, it can be seen that the instant invention provides a process for substantially eliminating chromatic discoloration from fused aluminum oxide. When a fluoride salt is also blended with the calcined alumina prior to fusing, a white fused and cast alumina substantially free of both chromatic and achromatic discoloration is formed. Although the resin and fluoride salt can be added in the specified quantities, that is less than 1% of each to the bulk of the calcined alumina to be fused, it has been found particularly desirable to mix the resin and fluoride salt with a small amount of calcined alumina prior to addition to the bulk of the calcined alumina to be processed. This facilitates addition and dispersion in the kiln product. A satisfactory mixture is in the ratio of 2 pounds of calcined alumina per 1 pound of resin and 1 pound of fluoride salt. The mixture, after suitable mixing, such as in a hammer mill, is then added to the bulk of the calcined alumina and mixed uniformly throughout it.

It is to be understood that other ways of blending the resin with the calcined alumina prior to fusing are also possible and are within the spirit and scope of the invention. For example, the resin may be added and blended as an emulsion or in solution in a volatile solvent.

It would be apparent to those skilled in the art that variations and modifications of the above outlined procedures may be made without departing from the spirit and scope of the invention which is limited only by the appended claims.

What is claimed is:

1. In the method of producing fused aluminum oxide by calcining alumina, fusing the calcined alumina and obtaining a solidified fused product, the improvement which comprises:
   (a) blending a thermoplastic resin consisting essentially of at least one straight-chain, hydrocarbon resin in which considerable cyclic but no aromatic structures are present with the calcined alumina prior to the fusing of the alumina, so that a fused alumina product substantially free of chromatic discoloration is formed when the calcined alumina is fused and solidified.

2. The method of claim 1 wherein the hydrocarbon resin is an alicyclic compound.

3. The method of claim 1 wherein the hydrocarbon resin is a terpene.

4. The method of claim 1 wherein the hydrocarbon resin is a pinene.

5. The method of claim 1 wherein the hydrocarbon resin is an alpha-pinene.

6. The method of claim 1 wherein the hydrocarbon resin is a hydrogenated alpha-pinene.

7. The method of claim 1 wherein the hydrocarbon resin is a petroleum alicyclic hydrocarbon resin produced by the catalytic polymerization of dienes and olefins from low-boiling distillates of cracked petroleum stocks.

8. The method of claim 7 wherein the hydrocarbon resin is hydrogenated.

9. The method of claim 1, including:
   (a) blending a fluoride salt with the calcined alumina prior to the fusing of the alumina, so that a white fused alumina product substantially free of chromatic and achromatic discoloration is formed when the calcined alumina is fused and solidified.

References Cited

UNITED STATES PATENTS

| | | | |
|---|---|---|---|
| 678,732 | 7/1901 | Hall | 23—142 |
| 811,433 | 1/1906 | Pechiney | 23—142 |
| 1,379,523 | 5/1921 | Burgess | 23—142 X |
| 1,785,464 | 12/1930 | Suzuki et al. | 23—142 |
| 2,163,532 | 6/1939 | Barnes. | |
| 2,894,898 | 7/1959 | Oettinger et al. | |
| 2,952,644 | 9/1960 | Holden. | |
| 2,961,296 | 11/1960 | Fenerty. | |
| 3,019,080 | 1/1962 | Vincent et al. | |
| 3,026,177 | 3/1962 | St. Pierre et al. | |

FOREIGN PATENTS

| | | |
|---|---|---|
| 531,202 | 10/1956 | Canada. |

OTHER REFERENCES

Schulman et al.: International Series of Monographs on Solid State Physics, vol. 2, "Color Centers in Solids," MacMillan Co., New York, 1962, pp. 12–14, 17 and 27.

EDWARD J. MEROS, *Primary Examiner.*

G. T. OZAKI, *Assistant Examiner.*